United States Patent [19]

Danielson et al.

[11] Patent Number: 4,504,512

[45] Date of Patent: Mar. 12, 1985

[54] PUDDING MIX COMPOSITION

[75] Inventors: Robert L. Danielson; Peter M. Bosco, both of Brookfield Center, Conn.; Wayne L. Steensen, Newark, Del.

[73] Assignee: Nabisco Brands, Inc., Parsippany, N.J.

[21] Appl. No.: 568,372

[22] Filed: Jan. 5, 1984

Related U.S. Application Data

[63] Continuation-in-part of Ser. No. 549,624, Nov. 7, 1983, abandoned.

[51] Int. Cl.³ .................... A23L 1/187; A23L 1/195
[52] U.S. Cl. .................................. 426/579; 426/578; 426/661
[58] Field of Search ......................... 426/578, 579

[56] References Cited

U.S. PATENT DOCUMENTS

| | | | |
|---|---|---|---|
| 3,515,591 | 6/1970 | Feldman | 426/579 |
| 3,619,208 | 11/1971 | Bahoshy | 426/579 |
| 3,914,456 | 10/1975 | Norsby | 426/579 |
| 3,970,767 | 7/1976 | Tessler et al. | 426/579 |
| 4,207,355 | 6/1980 | Chiu et al. | 426/579 |
| 4,228,199 | 10/1980 | Chiu et al. | 426/579 |
| 4,281,111 | 7/1981 | Hunt et al. | 426/579 |
| 4,303,451 | 12/1981 | Seidel et al. | 426/579 |

*Primary Examiner*—Jeanette Hunter
*Attorney, Agent, or Firm*—Richard Kornutik

[57] ABSTRACT

An instant pudding composition which, upon admixture with milk, produces a pudding having a creaminess and smoothness closely similar to that of a cooked starch pudding, while at the same time possessing sufficient firmness and cutting ability to function as a filling for dessert products such as pies or tarts, comprising pregelatinized starch, sugar, an alkali metal orthophosphate, an alkali metal pyrophosphate and an emulsifier component comprising a mixture of mono- and diglycerides.

20 Claims, No Drawings

PUDDING MIX COMPOSITION

BACKGROUND OF THE INVENTION

This application is a continuation-in-part of application Ser. No. 549,624, filed Nov. 7, 1983 now abandoned.

The present invention relates to an instant pudding and, more particularly, to a dry pudding mix composition which is formulated so as to provide, upon mixing with milk, a pudding having the eating characteristics of a cooked starch pudding and the physical and textural characteristics required for use as a pie filling.

The art has long endeavored to produce an instant pudding which has the eating characteristics of cooked starch pudding, and has made significant progress toward this goal in a number of instant pudding formulations. However, further improvement constantly is sought in attempting to more closely match the creaminess and smoothness of cooked starch puddings without, at the same time, adversely affecting the desirable characteristics of a dry pudding mix per se, i.e., its free-flowing particulate nature, ready dispersibility in milk, controlled setting and the like.

In addition to possessing the smoothness and creaminess of a cooked starch pudding, it is also highly desirable that the pudding prepared from an instant dry mix possesses the requisite physical and textural properties which permit its use as a filling for pies, tarts or other like products. Often, formulation measures in an instant pudding which are taken for purposes of more closely imitating the eating characteristics of a cooked pudding are at the expense of providing the characteristics required for use of the pudding as a pie or other filling, or vice versa.

Still further, a pudding mix must be capable of producing puddings, having desired characteristics, over a wide range of preparation conditions, i.e., with a variety of milk products, with a variety of mixing utensils and mixing times, with a variety of recipe formulations, etc.

SUMMARY OF THE INVENTION

It is an object of the present invention to provide a dry, flowable instant pudding mix which sets upon the addition of milk to a pudding having eating characteristics closely similar to those of a cooked starch pudding, while at the same time possessing sufficient rigidity and other properties which permit its use as a pie or tart filling.

Another object of the present invention is to provide a pudding mix of the type described which is capable of producing a pudding, having the above-described properties, over a wide range of preparation conditions.

These and other objects are achieved according to the present invention by the provision of a dry, flowable composition comprised of pregelatinized starch, sugar, an alkali metal pyrophosphate, an alkali metal orthophosphate and an emulsifier component.

In a preferred embodiment of the invention, a calcium salt which slowly releases calcium ions to the milk/pudding mix combination is employed in the pudding mix to achieve a more controlled, slower gelation in conjunction with the orthophosphate and pyrophosphate, as well as to contribute to the attainment of desired textural characteristics.

The emulsifier component for use in the present invention comprises a mixture of mono- and diglycerides. In a preferred embodiment of the invention, the emulsifier component is a mixture of mono- and diglycerides in admixture with propylene glycol (to aid in solubilization of the mono- and diglycerides). The preferred emulsifier component is characterized by having a weight percent monoglyceride (measured as alpha-monoglycerides) of at least about 46%, an iodine value of at least about 63 and a weight percent free fatty acids of no greater than about 1.0. Oil may also be present with the emulsifier component, as later described.

The pregelatinized starch component of the composition of the present invention comprises a mixture of at least two distinct pregelatinized starches. Each of the two pregelatinized starches preferably is derived either entirely from tapioca starch, entirely from waxy maize starch or from a mixture of tapioca starch and waxy maize starch. The first such pregelatinized starch is a pregelatinized modified starch, which is—in terms familiar to the art—lightly cross-linked by chemical means, moderately substituted, of relatively high viscosity in aqueous systems and which is characterized by producing a "long", elastic (fudgy) texture in a milk-based pudding. The second such pregelatinized starch also is a modified starch which is lightly cross-linked by chemical means, highly substituted, of relatively high viscosity in aqueous systems and which is characterized by producing a smooth, "short" texture in a milk-based pudding. Each of the starches is a quick-setting starch.

The unique combination of ingredients in the pudding mix composition of the present invention provides a mix which is free-flowing and readily dispersible in milk. The mix is capable of being converted to a pudding having desired physical and textural characteristics upon addition of a wide variety of milk products and over a wide variety of mixing procedures and conditions. The resultant pudding closely simulates the smooth and creamy eating characteristics of a cooked pudding while at the same time possessing a firmness and cutting quality which makes it ideally suited as a filling for pies, tarts or other dessert items.

DETAILED DESCRIPTION OF THE INVENTION

The dry pudding mix composition of the invention is of the type used to prepare a pudding by combining the mix with cold milk. The essential ingredients of the dry mix are a pregelatinized starch, gelling agents consisting of an alkali metal orthophosphate and an alkali metal pyrophosphate, sugar and an emulsifier component. The dry mix may also contain typical additional ingredients such as colorants, flavorants, antioxidants, preservatives and the like as is conventional in the art. As discussed hereinafter, preferred embodiments of the invention further call for use of a calcium salt as an essential ingredient to control gelation and an oil component to assist in dispersion of emulsifier.

As earlier noted, the pregelatinized starch component of the present invention comprises a mixture of at least two different pregelatinized starches. The first, which generally will be present as a major amount (e.g., greater than or equal to about 50% by weight) of the overall starch component, is a pregelatinized starch preferably derived from either tapioca starch, waxy maize starch or from a mixture of tapioca and waxy maize starches. This first starch is a pregelatinized starch which is modified chemically to render it lightly cross-linked and moderately substituted, and is characterized as being of high viscosity when swelled in aqueous systems and by producing a pudding (milk-based; phosphate gelling system) which is of a firm, long, elastic (fudgy) texture.

The second starch is a pregelatinized starch also preferably derived from either tapioca starch, waxy maize starch or from a mixture of tapioca and waxy maize starches, which is chemically modified to render it lightly cross-linked and heavily substituted, and which is characterized as being of high viscosity when swelled in aqueous systems and by producing a pudding (milk-based; phosphate gel system) which is of a short, smooth texture.

Other starches also may be present in the pudding mix composition, typically in minor amounts (e.g., less than about 10% by weight of the total starch component), provided they do not adversely affect the balance of creaminess/smoothness and firmness/cutting ability required in the pudding product made therefrom. These starches can be any of the food-grade pregelatinized starches conventionally employed in puddings which are wettable and easily dispersible in cold milk, such as those derived from rice, wheat, corn, potato, sago, tapioca or other like starches.

A suitable and preferred starch for use as the first portion of the pregelatinized starch component is available under the trade name H50B-N from the National Starch Company and is derived from a mixture of tapioca starch and waxy maize starch. A suitable and preferred starch for use as the second ingredient in the pregelatinized starch component is available under the trade designation "447" from A. E. Staley & Co. and is derived from tapioca starch.

The particle size of the pregelatinized starch employed in the pudding mix of the present invention is not critical per se, but should be chosen to provide easy dispersibility in cold milk, and should be fine enough to prevent the development of a gritty or pebbly texture or appearance in the pudding. If possible, the particle size of the starches should be relatively consistent with the particle sizes of other ingredients employed in the pudding mix so as to minimize ingredient segregation in package units. Generally, the size of the pregelatinized starch should be such that at least 90% of the starch is capable of passing through a No. 200 U.S. Standard Screen.

The sugar in the pudding mix is necessary for sweetness and can also aid in dispersing the various ingredients and promoting rapid mixing free of lumps. Among the suitable sugars are sucrose, fructose, dextrose, glucose, highly converted dry corn syrup solids, high fructose corn syrup solids, and other sugars of commerce which have the requisite properties. Preferred sugars will wet rapidly but not be so hygroscopic that the mixes will clump in the standard liners or other packaging materials typically used for storage. Sucrose is preferred, but other materials which are more highly hygroscopic can be employed. Particularly preferred is a mixture of powdered (milled) sucrose and granular sucrose.

Artificial sweeteners also may be employed in the pudding mix of the present invention to provide some or all of the requisite sweetness in the pudding product. Use of such sweeteners (e.g., saccharin, aspartame) will require that suitable non-sweet bulking agents be employed to replace solids lost by substitution of these sweeteners for all or part of the sugar.

The pudding compositions of the invention are formulated to be mixed with milk which then interacts with the gelling agents to coagulate and form a firm-but-smooth-texture pudding. The term "milk" is defined herein to include any aqueous solution of milk protein such as whole fluid milk, partially skimmed milk, skimmed milk, reconstituted nonfat dry milk, reconstituted casein, and the like. The composition of the present invention can be added to the aqueous milk protein solution containing milk protein at any effective concentration for forming the film gel. Typically, the concentration of milk protein will be from about 3.0 to about 5.0 percent of the weight of the final pudding, and will preferably be at a concentration within the range of from 3.5 to 4.5 percent on this same basis. The milk is preferably employed cold, e.g. at a temperature of less than 20° C., and most preferably at about 10° C. or less.

It is a distinct advantage of the present invention that the pudding mix can be converted to a pudding having the desired physical and textural properties employing a variety of milk products and mixing procedures.

The gelling agents for use in the dry pudding mix composition will include an alkali metal pyrophosphate and an alkali metal orthophosphate and, in preferred embodiments, a calcium salt.

Of these gelling agents, the alkali metal pyrophosphates are the principal actors in forming the gel along with the protein and the calcium present in solution. By alkali metal pyrophosphate is meant to include all water-soluble, edible alkali metal pyrophosphates. Principal among these are the di- and tetra-sodium and potassium pyrophosphates. Preferred among these is tetra sodium pyrophosphate. The alkali metal pyrophosphate is typically employed in an amount within the range of from about 0.5 to 2.0%, based on the weight of the dry pudding composition. Preferably, the alkali metal pyrophosphate will be employed in an amount within the range of from about 1.0 to 2.0% on this same basis.

The alkali metal orthophosphate is an accelerator which speeds the gelling reaction given the presence of calcium, protein and alkali metal pyrophosphate. Among the most suitable orthophosphates are the di- and tri-sodium and potassium salts, with disodium orthophosphate being preferred. These salts are typically employed in amounts within the range of from 0.5 to 4.0%, and preferably within the range of from 1.0 to 2.5%, based on the total weight of the dry composition.

The gelling system employed in the dry pudding mix may also include additional ingredients to assist in and/or control the rate of setting. For example, in a preferred embodiment of the invention, a calcium salt which slowly releases calcium ions to the mixture of pudding mix and milk (i.e., which is slowly soluble in the mixture) is included in the dry pudding mix. Use of a calcium salt of this type, and reliance at least in part upon the calcium ions from this salt for gelation, affords a degree of control over the gelation process and prolongs the onset of gelation so that the pudding does not set so rapidly as to make it difficult to pour the pudding mix/milk mixture from a mixing apparatus into a serving dish, pie shell, or the like in which it will set. Moreover, it is desirable that significant gelation not occur during mixing since the shear forces from the mixing will oppose the gelation and possibility result in a pudding product which does not set in the intended manner or which possesses a texture differing from that intended via original formulation of the mix.

Use of a calcium salt in accordance with the preferred embodiment of the invention also permits attainment of the desired firm body in the pudding product without need for excessive amounts of starch, which could lead to a product having an unacceptably gummy texture. As earlier noted, the desired texture is characterized as being creamy yet firm enough to exhibit a sharp cutting texture and resist slumping or loss of shape when cut (e.g., as an individual piece from a pie).

The use of a calcium salt may be particularly useful in pudding mixes containing other ingredients (e.g., alkali treated cocoa or other flavors) which might otherwise interfere with development of the desired degree and type of gelation.

The slowly-soluble or slow-release calcium salt, which may for example be calcium sulfate, typically will be present in an amount within the range of from 0.06 to 0.6%, and preferably within the range of from 0.2 to 0.4%, based on the weight of the dry composition.

The emulsifier component according to the present invention promotes easy dispersion of the ingredients of the dry mix composition in the milk and, together with the other ingredients of the mix, imparts to the set pudding an improved creaminess and smoothness and improved firmness and cutting ability. The emulsifier component is a mixture of mono- and diglycerides, preferably liquid at room temperature. A preferred emulsifier is a mixture of mono- and diglycerides to which propylene glycol has been added, generally in an amount of from about 8 to 10% by weight of the total mixture of glycol and glycerides. The mixture of mono- and diglycerides can be prepared by the direct esterification of edible fatty acids and glycerine and will preferably comprise at least 46% by weight monoglycerides (measured as alpha-monoglycerides), have less than about 1% by weight free fatty acids and have an iodine value of at least about 63.

The emulsifier component for use in the present invention is, at room temperature, preferably a liquid oily product which preferably is incorporated in the dry composition by first forming a pre-blend of the emulsifier (melted if necessary), a portion of the starch and a portion of the sugar. In a particularly preferred embodiment of the invention, an oil also is employed in preparing the pre-blend to aid dispersion of the emulsifier throughout the pudding mix/milk admixture. The oil employed can be any edible oil, and generally will be present at a level of about one-fourth to one-half the amount of emulsifier employed.

The formation of a pre-blend is desirable in order to promote dry, free-flow qualities in the pudding mix and to avoid balling or clumping of ingredients in the dry mix which could result in the presence of undissolved particles in the final pudding product. This pre-blend is then incorporated together with the remaining ingredients to form the dry pudding composition.

A suitable emulsifier component having the required characteristics of the preferred emulsifier is available from Durkee Industrial Foods Group (division of SCM Corp.), Cleveland, Ohio, under the trade designation Dur-Em 300 (made from animal fats) or Dur-Em 300K (made from vegetable fats). A suitable oil is a partially hydrogenated cottonseed/soybean oil also available from Durkee under the trade designation Duromel, having a Wiley melting point of about 101° F., a free fatty acid content of less than about 0.1%, and an SFI profile as follows:

50° F. (56 minimum); 70° F. (43 minimum); 80° F. (36 minimum); 92° F. (16 minimum); 100° F. (8 maximum).

Based upon the total weight of ingredients in the dry pudding mix, the emulsifier (i.e., the mono- and diglycerides) typically will be present in an amount ranging from about 0.1 to about 0.6%, preferably in the range of from about 0.2 to about 0.4%.

A typical pudding mix composition according to the present invention will contain, based upon the total weight of the mix, from about 10 to about 30% starch, and from about 65 to 85% sugar, the remainder comprising the gelling system ingredients, emulsifier, colorants, flavorants, antioxidants and the like.

With the exception of the emulsifier, the ingredients of the pudding composition are particulate solids having particle size distributions which insure good dispersibility in milk and a minimum degree of segregation when packaged. The pudding mix is freely-flowable and dry (e.g., less than about 6% water by weight and preferably less than about 4% by weight) so as to prevent any possibility of microbial contamination and to prevent caking or lumping in the package. When admixed with cold milk, the composition, owing to the presence of emulsifier and, to some extent sugar, and the proper choice of particle size for all the ingredients, can be converted to a smoothtextured product which sets or coagulates to provide a pudding having a creaminess, smoothness, mouthfeel and melting characteristics highly reminiscent of a cooked pudding, while at the same time possessing a sufficient degree of firmness and cutting ability to serve as a filling for pies, tarts, etc.

The following examples are provided for purposes of illustrating the invention. Unless otherwise indicated, all parts and percentages are by weight.

EXAMPLE I

A vanilla-flavored instant pudding mix can be formulated as follows:

| Ingredient | Percent |
| --- | --- |
| Milled Sugar | 40–50 |
| Granular Sugar | 20–25 |
| Modified Food Starch (H50B-N) | 8–12 |
| Emulsifier pre-blend* | 10–14 |
| Disodium Orthophosphate | 1–2 |
| Tetrasodium pyrophosphate | 1–2 |
| Modified Tapioca Food Starch (447) | 0.7–2.0 |
| Flavors, colors, salt | Balance |

*The blend contains, e.g., 60 to 70% granular sugar, 20 to 35% H50B-N starch, 2 to 5% Dur-Em 300K, 0.5 to 2.5% oil (Duromel) and balance antioxidants.

The ingredients are mixed in a suitable food-grade mixer. Approximately 96 grams of this composition can be mixed with about 16 oz. of whole cows milk at a temperature of about 10° C., with stirring, for about one to two minutes (where the pudding is to be used as a pie filling, mixing on the order of one minute is recommended to insure that the pudding does not set during the mixing to a degree which would make pouring of the filling into a pie crust difficult; where the pudding will be eaten as is, mixing on the order of two minutes is acceptable). After refrigeration for 0.5 to 1.0 hours, the pudding product will possess excellent smoothness, creaminess and mouthfeel, as well as a firmness and cutting ability which makes it useful as a pie filling in a pie product (e.g., in a no-bake pie product).

EXAMPLE II

A chocolate-flavored instant pudding mix can be formulated as follows:

| Ingredient | Percent |
| --- | --- |
| Milled Sugar | 40–50 |
| Granular Sugar | 20–25 |
| Modified Tapioca Starch (447) | 5–10 |
| Modified Food Starch (H50B-N) | 3–10 |
| Cocoa (dutched) | 4–8 |
| Emulsifier pre-blend* | 8–12 |
| Disodium Orthophosphate | 1.5–3.0 |
| Tetrasodium pyrophosphate | 1.0–2.0 |
| Calcium Sulfate | 0.2–0.5 |
| Flavor, color, salt | Balance |

*60 to 70% granular sugar, 20 to 35% H50B-N starch, 2 to 5% Dur-Em 300K, 0.5 to 2.5% Duromel, balance antioxidants.

Approximately 117 grams of this composition can be mixed with about 16 oz. whole cows milk at a temperature of about 10° C., with stirring, for about one to two minutes (where the pudding is to be used as a pie filling, mixing on the order of one minute is recommended to insure that the pudding does not set during the mixing to a degree which would make pouring of the filling into a pie crust difficult; where the pudding will be eaten as is, mixing on the order of two minutes is acceptable). After refrigeration for 0.5 to 1.0 hours, the pudding will possess an excellent texture in terms of creaminess and smoothness, a pleasant mouthfeel, and a firmness and cutting ability suitable for use as a pie filling.

The pudding mix according to the present invention requires a combination of starches, emulsifier, gelling agents and other ingredients which produce, over a wide range of preparation conditions, a pudding which exhibits the creaminess and smoothness associated with cooked starch puddings as well as the firmness required for use of the pudding as a filling in products, such as pies, which are intended to hold their shape when cut into individual pieces. Within the descriptions and ranges of ingredients set forth herein, a variety of pudding mixes can be prepared which exhibit the desired properties to varying degrees. The provision of particular formulations within these ranges producing puddings of optimized properties is well within the skill of the art utilizing known objective and subjective testing criteria.

The above description has been for the purpose of explaining the invention to people skilled in the art and is not meant to describe all those obvious modifications and variations of it which will become apparent upon a reading. Applicants do, however, consider all such modifications and variations to be within the scope of their invention which is defined by the following claims.

What is claimed is:

1. A dry pudding mix composition adapted to produce an edible pudding upon admixture with milk, comprising a dry particulate, free-flowing mixture of pregelatinized starch, sugar, an alkali metal pyrophosphate, an alkali metal orthophosphate, and, based upon the weight of the dry composition, from about 0.1 to about 0.6% of an emulsifier component, wherein said emulsifier component comprises a mixture of mono- and diglycerides, and wherein the pregelatinized starch component comprises a mixture of first and second pregelatinized starches, derived from tapioca starch, waxy maize starch or mixtures thereof, said first pregelatinized starch being a chemically-modified, lightly cross-linked, moderately substituted pregelatinized starch characterized by being of high viscosity when swelled in aqueous systems and by producing a firm, long, elastic (fudgy) texture when employed in a milk-based, phosphate gelled pudding, and said second pregelatinized starch being a chemically-modified, lightly cross-linked, highly-substituted pregelatinized starch characterized by being of high viscosity when swelled in aqueous systems and by producing a short, smooth texture when employed in a milk-based, phosphate gelled pudding, whereby a pudding made upon mixing said mix composition with milk possesses a creaminess and smoothness closely simulating that of a cooked pudding and a firmness and cutting ability suitable for use of the pudding as a filling for pastry or pies.

2. A dry pudding mix according to claim 1 wherein said mix further includes a calcium salt which slowly releases calcium ions to the mixture of said pudding mix and milk.

3. A dry pudding mix according to claim 2 wherein said calcium salt is calcium sulfate.

4. A dry pudding mix according to claim 1 further comprising an edible oil in an amount of from about one-fourth to about one-half the weight of said emulsifier.

5. A dry pudding mix according to claim 4 wherein said oil is a partially hydrogenated vegetable oil.

6. A dry pudding mix according to claim 1 wherein said emulsifier component comprises a mixture of mono- and diglycerides and propylene glycol, has a free fatty acid content of less than about 1.0%, an iodine value of at least about 63 and a monoglyceride content (measured as alpha-monoglycerides) of at least about 46%.

7. A dry pudding mix according to claim 6 wherein the propylene glycol content of said emulsifier component is in the range of from about 8 to 10% by weight.

8. A dry pudding mix according to claim 1 wherein said alkali metal pyrophosphate is tetrasodium pyrophosphate.

9. A dry pudding mix according to claim 8 wherein said alkali metal orthophosphate is disodium orthophosphate.

10. A dry pudding mix composition adapted to produce an edible pudding upon admixture with milk, comprising a dry, particulate, free-flowing mixture of from about 10 to 30% by weight pregelatinized starch, from about 65 to 85% by weight sugar, from about 0.5 to 2.0% by weight alkali metal pyrophosphate, from about 0.5 to 4.0% by weight alkali metal orthophosphate, from about 0.1 to 0.6% by weight of an emulsifier component, and from about 0.025 to about 0.3% by weight of an edible oil, wherein said emulsifier component comprises a mixture of propylene glycol and mono- and diglycerides, has a free fatty acid content of less than about 1.0%, an iodine value of at least about 63, and at least about 46% monoglycerides (measured as alpha-monoglycerides), and wherein said pregelatinized starch comprises a mixture of first and second pregelatinized starches, derived from tapioca starch, waxy maize starch or mixtures thereof, said first pregelatinized starch being a chemically-modified, lightly cross-linked, moderately substituted pregelatinized starch characterized by being of high viscosity when swelled in aqueous systems and by producing a firm, long, elastic (fudgy) texture when employed in a milk-based, phosphate gelled pudding, and said second pregelatinized starch being a chemically-modified, lightly cross-linked, highly-substituted pregelatinized starch characterized by being of high viscosity when swelled in aqueous systems and by producing a short, smooth texture when employed in a milk-based, phosphate gelled pudding.

11. A process for producing a dry, free-flowing, pudding mix composition which is readily dispersible in cold milk, said pudding mix composition comprising a mixture of pregelatinized starch, sugar, an alkali metal pyrophosphate, an alkali metal orthophosphate and an emulsifier component comprised of a mixture of mono- and diglycerides, said process comprising mixing together said emulsifier component, a vegetable oil and a portion of said starch and said sugar to form a free-flowing particulate mixture, and thereafter adding said mixture to the remaining dry, free-flowing ingredients of the pudding mix composition.

12. A dry pudding mix composition adapted to produce an edible pudding upon admixture with milk, comprising a dry particulate, free-flowing mixture of pregelatinized starch, a sweetener selected from the group consisting of saccharin, aspartame and mixtures thereof, an alkali metal pyrophosphate, an alkali metal orthophosphate, and, based upon the weight of the dry composition, from about 0.1 to about 0.6% of an emulsifier component, wherein said emulsifier component comprises a mixture of mono- and diglycerides, and wherein the pregelatinized starch component comprises a mixture of first and second pregelatinized starches, derived from tapicoa starch, waxy maize starch or mixtures thereof, said first pregelatinized starch being a chemically-modified, lightly cross-linked, moderately substituted pregelatinized starch characterized by being of high viscosity when swelled in aqueous systems and by producing a firm, long, elastic (fugdy) texture when employed in a milk-based, phosphate gelled pudding, and said second pregelatinized starch being a chemically-modified, lightly cross-linked, highly-substituted pregelatinized starch characterized by being of high viscosity when swelled in aqueous systems and by producing a short, smooth texture when employed in a milk-based, phosphate gelled pudding, whereby a pudding made upon mixing said mix composition with milk possesses a creaminess and smoothness closely simulating that of a cooked pudding and a firmness and cutting ability suitable for use of the pudding as a filling for pastry or pies.

13. A dry pudding mix according to claim 12 wherein said mix further includes a calcium salt which slowly releases calcium ions to the mixture of said pudding mix and milk.

14. A dry pudding mix according to claim 13 wherein said calcium salt is calcium sulfate.

15. A dry pudding mix according to claim 12 further comprising an edible oil in an amount of from about one-fourth to about one-half the weight of said emulsifier.

16. A dry pudding mix according to claim 12 wherein said emulsifier component comprises a mixture of mono- and diglycerides and propylene glycol, has a free fatty acid content of less than about 1.0%, an iodine value of at least about 63 and a monoglyceride content (measured as alpha-monoglycerides) of at least about 46%.

17. A dry pudding mix according to claim 12 wherein said alkali metal pyrophosphate is tetrasodium pyrophosphate.

18. A dry pudding mix according to claim 17 wherein said alkali metal orthophosphate is disodium orthophosphate.

19. A dry pudding mix according to claim 12 wherein said mix further includes a bulking agent.

20. A dry pudding mix composition adapted to produce an edible pudding upon admixture with milk, comprising a dry particulate, free-flowing mixture of pregelatinized starch, a sweetener selected from the group consisting of saccharin, aspartame and mixtures thereof, an edible bulking agent, an alkali metal pyrophosphate, an alkali metal orthophosphate, and an emulsifier component, wherein said emulsifier component comprises a mixture of mono- and diglycerides, and wherein the pregelatinized starch component comprises a mixture of first and second pregelatinized starches, derived from tapioca starch, waxy maize starch or mixtures thereof, said first pregelatinized starch being a chemically-modified, lightly cross-linked, moderately substituted pregelatinized starch characterized by being of high viscosity when swelled in aqueous systems and by producing a firm, long, elastic (fudgy) texture when employed in a milk-based, phosphate gelled pudding, and said second pregelatinized starch being a chemically-modified, lightly cross-linked, highly-substituted pregelatinized starch characterized by being of high viscosity when swelled in aqueous systems and by producing a short, smooth texture when employed in a milk-based, phosphate gelled pudding, whereby a pudding made upon mixing said mix composition with milk possesses a creaminess and smoothness closely simulating that of a cooked pudding and a firmness and cutting ability suitable for use of the pudding as a filling for pastry or pies.

* * * * *